US 7,014,163 B2

(12) United States Patent
Fukano et al.

(10) Patent No.: US 7,014,163 B2
(45) Date of Patent: Mar. 21, 2006

(54) PILOT-CONTROLLED ELECTROMAGNETIC VALVE

(75) Inventors: Yoshihiro Fukano, Yawara-mura (JP); Masayuki Oshima, Yawara-mura (JP)

(73) Assignee: SMC Corporation, Tokyo (JP)

( * ) Notice: Subject to any disclaimer, the term of this patent is extended or adjusted under 35 U.S.C. 154(b) by 0 days.

(21) Appl. No.: 10/911,101

(22) Filed: Aug. 4, 2004

(65) Prior Publication Data

US 2005/0040354 A1 Feb. 24, 2005

(30) Foreign Application Priority Data

Aug. 8, 2003 (JP) .............................. 2003-206739

(51) Int. Cl.
*F16K 31/00* (2006.01)
*F16K 31/12* (2006.01)
*F16K 31/44* (2006.01)

(52) U.S. Cl. ................. 251/14; 251/30.01; 251/129.03
(58) Field of Classification Search ................... 251/14, 251/30.01, 129.03; 137/625.65
See application file for complete search history.

(56) References Cited

U.S. PATENT DOCUMENTS 5,441,233 A * 8/1995 Asou et al. ............ 251/129.15
5,535,783 A * 7/1996 Asou et al. ............ 137/625.65
6,267,140 B1 * 7/2001 Hayashi et al. ............. 137/554

FOREIGN PATENT DOCUMENTS

JP 283118 10/2000
JP 250463 9/2002

* cited by examiner

*Primary Examiner*—Justine R. Yu
*Assistant Examiner*—John K. Fristoe, Jr.
(74) *Attorney, Agent, or Firm*—Baker Botts L.L.P.

(57) ABSTRACT

A pilot-controlled electromagnetic valve is capable of preventing tilting of a piston and of shortening the piston with a simplified arrangement and allows a main valve element to be moved by actuation of a manual controller by transmitting the motion of the manual controller to both the piston and the main valve element. A partition is formed between a piston chamber and a manual controller chamber. A guide hole is formed in the partition. A guide projection is formed on the left side of the piston. The guide projection is inserted through the guide hole to project into the manual controller chamber. The manual controller having a sloped surface is reciprocatably provided in the manual controller chamber. Actuation of the manual controller causes the sloped surface to contact the sloped portion of the guide projection, thereby enabling both the piston and the main valve element to be moved.

4 Claims, 3 Drawing Sheets

PILOT-CONTROLLED ELECTROMAGNETIC VALVE

BACKGROUND OF THE INVENTION

1. Field of the Invention

The present invention relates to a pilot-controlled electromagnetic directional control valve (pilot-controlled electromagnetic valve) for use in a pneumatically operated system.

2. Description of the Related Art

Japanese Patent Application Unexamined Publication (KOKAI) No. 2000-283118 (patent document 1) discloses a pilot-controlled electromagnetic valve in which a main valve chamber is formed at one side of a piston chamber, and a manual controller chamber is formed at the other side of the piston chamber with a partition interposed therebetween. A piston is slidably provided in the piston chamber. A main valve element is slidably provided in the main valve chamber. The main valve element is moved by the movement of the piston. FIG. 3 is a sectional view showing the pilot-controlled electromagnetic valve disclosed in the patent document 1, in which the disclosure of the patent document 1 is rearranged to clarify constituent members or portions common to the patent document 1 and the present invention.

In FIG. 3, a main valve block 10 is disposed adjacently to one side (right side in FIG. 3) of a manual controller-equipped piston block 11. The main valve block 10 and the piston block 11 are secured to each other by using a connecting member 20, etc. A pilot valve 12 is disposed adjacently to the other side (left side in FIG. 3) of the piston block 11. The piston block 11 and the pilot valve 12 are secured to each other by using bolts or the like. The main valve block 10 has a main valve chamber 13 extending therethrough in the longitudinal direction. A main valve element (spool) 14 is slidably provided in the main valve chamber 13. The main valve block 10 is provided with a first exhaust port EA, a first output port A, an air supply port P, a second output port B, and a second exhaust port EB that are open on the lower surface of the main valve block 10 in the order mentioned from one end thereof. Each port communicates with a predetermined portion of the main valve chamber 13.

The piston block 11 has a piston chamber 15 that is open at one side thereof. The piston chamber 15 has a larger diameter than that of the main valve chamber 13. The piston chamber 15 and the main valve chamber 13 are disposed concentrically and communicated with each other. A spring retainer 24 is secured to one end (right end in FIG. 3) of the main valve chamber 13 that communicates with the atmosphere. A spring 17 is interposed between the spring retainer 24 and the bottom of an opening 25 at one end of the main valve element 14. A piston 16 is slidably provided in the piston chamber 15. When compressed air is supplied into a piston first chamber (chamber at the left side of the piston 16 in FIG. 3) 22, the piston 16 and the main valve element 14 move in one direction (rightward in FIG. 3) against the force of the spring 17. It should be noted that two O-rings hermetically seal between the inner peripheral wall of the main valve chamber 13 and both end portions of the main valve element 14.

The piston block 11 is provided with a valve element 18, a supply port p, an output port a, and an exhaust port e. The supply port p communicates with the supply port P through a supply passage 27 in the piston block 11 and further through a supply passage 27a in the main valve block 10. The output port a communicates with the piston first chamber 22 through an output passage 28. The exhaust port e communicates with the atmosphere. The piston block 11 is formed with a manual controller chamber (not shown), and a manual controller (not shown) is provided in the manual controller chamber. In response to actuation of the manual controller, compressed air is supplied into the piston first chamber 22.

An annular groove is formed on the outer periphery of the piston 16. A piston packing 30 for sealing is fitted in the annular groove. In order to prevent air leakage through the piston packing 30 and non-uniform wear thereof, the piston 16 needs to be provided with a guide that prevents the piston 16 from tilting. Incidentally, the electromagnetic valve shown in FIG. 3 is of the two-position type. In the case of a three-position type electromagnetic valve, the guide is particularly important because there is an operating step at which the piston 16 and the main valve element 14 separate from each other. In general, a guide is provided at each side of the piston packing 30, as shown in FIG. 3. As the width of the guide increases, the overall length L of the electromagnetic valve increases, which goes against the demand for a reduction in size. Therefore, it is desired to eliminate the width L' of the piston 16 to thereby shorten the piston 16. It is also desired to simplify the relationship between the manual controller and the piston 16.

Japanese Patent Application Unexamined Publication (KOKAI) No. 2002-250463 (patent document 2) discloses in FIG. 3, etc. thereof a pilot-controlled electromagnetic valve wherein an annular projection is provided on one side of the piston, and a small-diameter projection on the other side (i.e. side closer to the piston) of the main valve element is fitted to the annular projection. This structure is judged to be capable of preventing tilting of the piston and of eliminating the width L' of the piston to thereby shorten the piston. Thus, the technique of preventing tilting of the piston and also shortening the piston has already been known. The present invention aims at preventing tilting of the piston and shortening the piston with a simplified arrangement.

SUMMARY OF THE INVENTION

An object of the present invention is to provide a pilot-controlled electromagnetic valve that is capable of preventing tilting of the piston and of shortening the piston with a simplified arrangement and that allows the main valve element to be moved by actuation of the manual controller by transmitting the motion of the manual controller to both the piston and the main valve element.

To attain the above-described object, the present invention is applied to a pilot-controlled electromagnetic valve wherein a main valve chamber is formed at one side of a piston chamber, and a manual controller chamber is formed at the other side of the piston chamber with a partition interposed therebetween. A piston is slidably provided in the piston chamber. A main valve element is slidably provided in the main valve chamber. The main valve element is moved by movement of the piston.

According to a first arrangement of the present invention, a guide hole is formed in the partition, and a guide projection is formed on the other side of the piston. The guide projection is inserted through the guide hole to project into the manual controller chamber. A manual controller having a sloped surface is reciprocatably provided in the manual controller chamber. Actuation of the manual controller causes the sloped surface to contact the guide projection, thereby moving the piston.

According to a second arrangement of the present invention, the sloped surface in the first arrangement is formed on the distal end portion of the manual controller to face toward the one side. A gently sloped portion is formed at the distal end of the guide projection. The sloped surface and the sloped portion are engageable with each other. It should be noted that examples of the configuration of the sloped portion are a frustoconical surface, a paraboloid of revolution, and a spherical surface.

According to a third arrangement of the present invention, the pilot-controlled electromagnetic valve according to the first and second arrangements is arranged as follows. A support surface is formed on the other side of the manual controller chamber. The other side surface of the manual controller slidably contacts the support surface, thereby preventing the sloped surface from moving in the direction toward the other side.

According to a fourth arrangement of the present invention, the manual controller in the first to third arrangements is unable to rotate and movable within a limited range in the manual controller chamber and has a grip portion formed at the proximal end thereof.

In the present invention, a guide hole is formed in the partition between the piston chamber and the manual controller chamber, and a guide projection is formed on the other side of the piston. The guide projection is inserted through the guide hole to project into the manual controller chamber. With an arrangement in which the guide projection of the piston is inserted through the guide hole, which is simpler than the arrangement of the patent document 2, tilting of the piston is prevented, and the piston is shortened. Thus, the overall length L of the electromagnetic valve is reduced.

A manual controller having a sloped surface is reciprocatably provided in the manual controller chamber. Actuation of the manual controller causes the sloped surface to contact the guide projection, thereby enabling both the piston and the main valve element to be moved. Thus, the main valve element can be moved with a simplified arrangement in which the motion of the manual controller is transmitted directly to the piston.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Figure 1B:
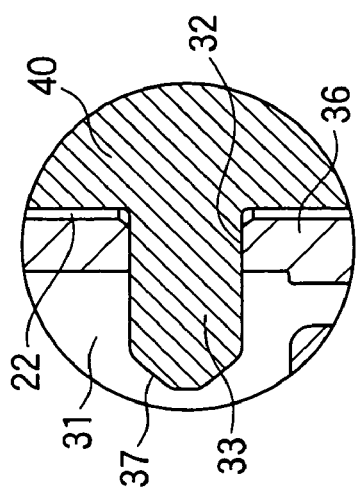
FIG. 1B is an enlarged view of an essential part of FIG. 1A.
Figure 1A:
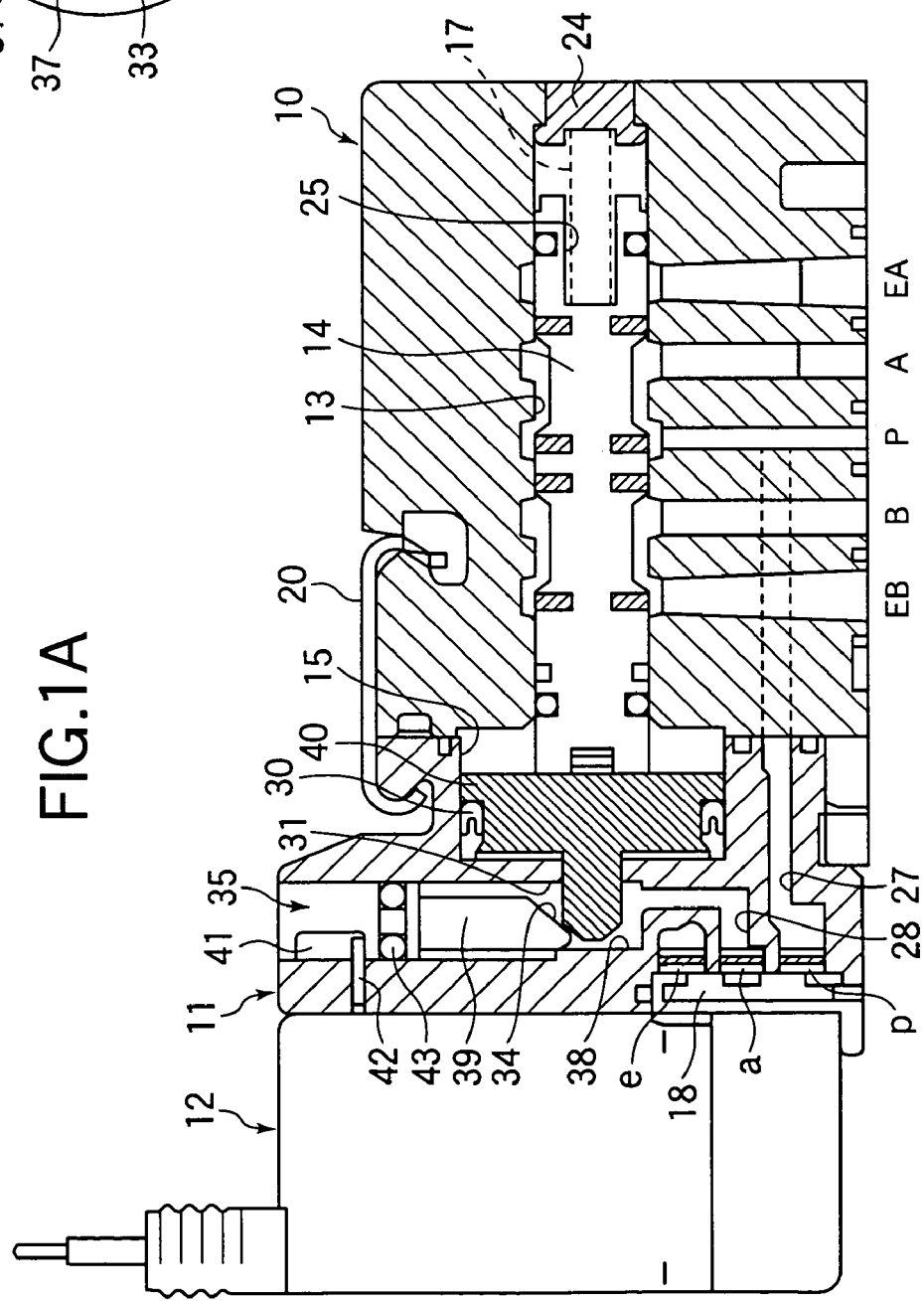
FIG. 1A is a sectional view of the pilot-controlled electromagnetic valve according to the present invention.
Figure 2:
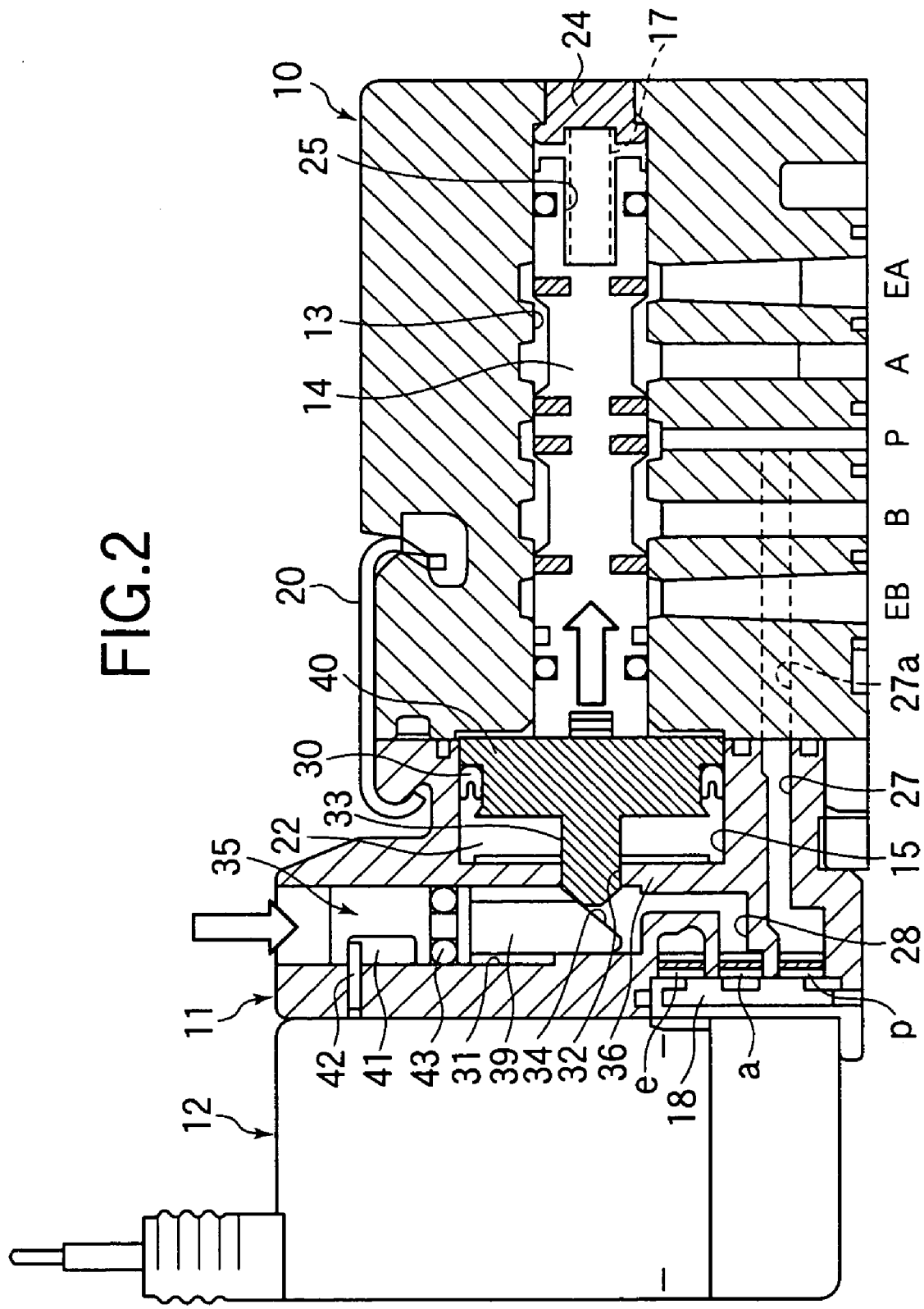
FIG. 2 is a sectional view of the pilot-controlled electromagnetic valve according to the present invention when it is manually controlled.
Figure 3:
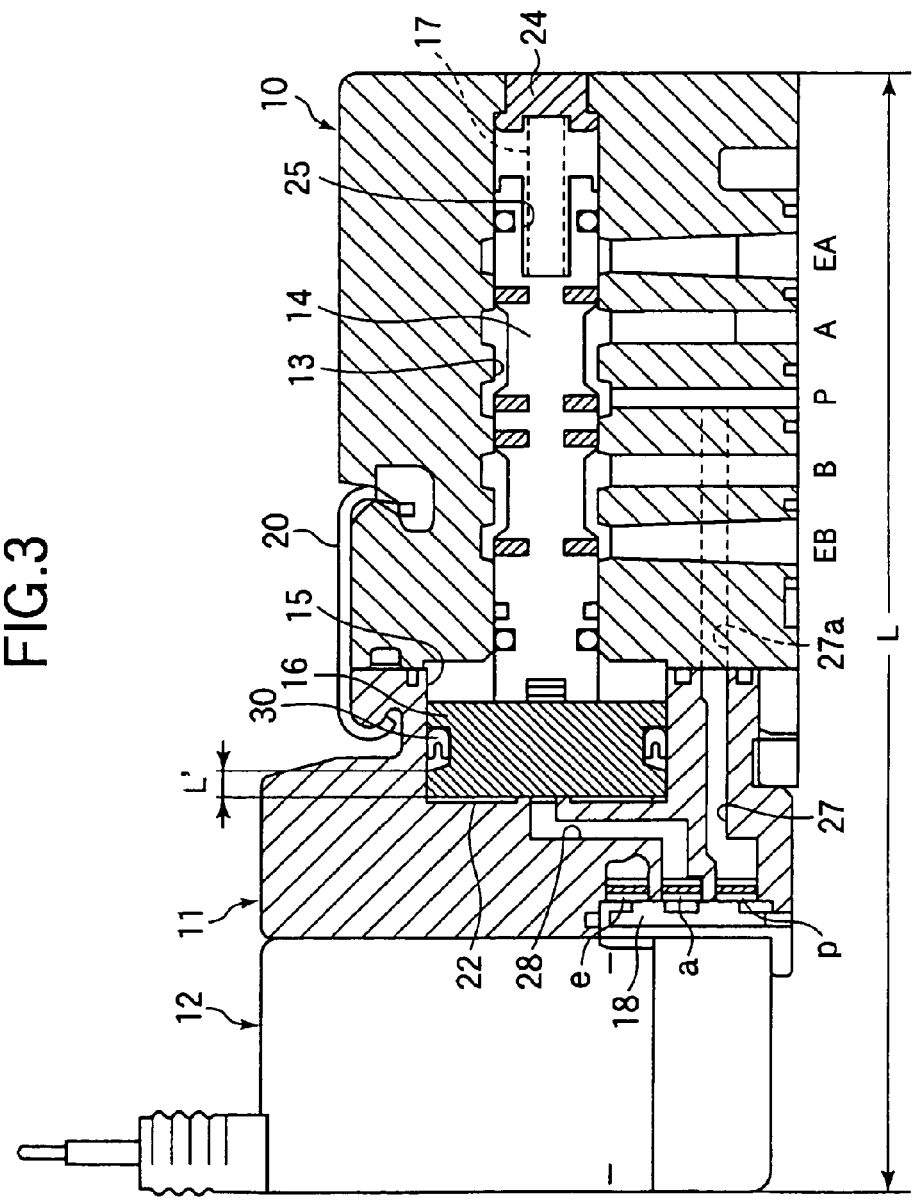
FIG. 3 is a sectional view of a conventional pilot-controlled electromagnetic valve.

FIGS. 1A, 1B and 2 show an embodiment of the pilot-controlled electromagnetic valve according to the present invention. In FIGS. 1A, 1B and 2, the same members as those in FIG. 3 are denoted by the same reference numerals as in FIG. 3, and a description thereof will be omitted or given briefly. It should be noted that the terms "rightward" and "leftward" as used in the description of the embodiment mean "toward one direction" and "toward the other direction", respectively, in the present invention. Similarly, the terms "right side" and "left side" mean "one side" and "the other side", respectively, in the present invention.

The feature of the embodiment is as follows. A guide hole 32 is formed in a partition 36 between a piston chamber 15 and a manual controller chamber 31. A guide projection 33 is formed on the left side of a piston 40. The guide projection 33 is inserted through the guide hole 32 to project into the manual controller chamber 31. A manual controller 35 having a sloped surface 34 is reciprocatably provided in the manual controller chamber 31. Actuation of the manual controller 35 causes the sloped surface 34 to contact the guide projection 33, thereby moving the piston 40 and the main valve element 14.

The piston 40 is shorter in width than the conventional piston 16 by the width L' (see FIG. 3) and has an approximately cylindrical guide projection 33 formed on the left side thereof. A gently sloped portion 37 is formed at the distal end of the guide projection 33. Although a sloped portion 37 having a frustoconical surface is shown in FIGS. 1A and 1B, the configuration of the sloped portion 37 is not necessarily limited thereto but may be a paraboloid of revolution, a spherical surface, etc. The guide projection 33 is inserted through the guide hole 32 in such a manner that air can freely flow therebetween. The sloped portion 37 is located in the manual controller chamber 31. By inserting the guide projection 33 through the guide hole 32, the piston 40 is prevented from tilting. With a view to ensuring the tilting prevention and the flow of air, the outer peripheral portion of the guide projection 33 is formed with a large number of longitudinal grooves extending in the longitudinal direction (horizontal direction in FIG. 1A). Thus, it is possible to eliminate play between the guide hole 32 and the outer peripheral portion of the guide projection 33 and yet possible to allow air to flow through the longitudinal grooves.

The manual controller chamber 31 is formed in a manual controller-equipped piston block 11 to extend vertically. The upper end of the manual controller chamber 31 is open on the upper surface of the piston block 11. A manual controller 35 is reciprocatably inserted in the manual controller chamber 31. A pin 42 is engaged in a guide groove 41 formed in an upper end portion of the manual controller 35, thereby making the manual controller 35 unable to rotate and limiting the range of reciprocating motion of the manual controller 35. An O-ring 43 is fitted in an annular groove formed in a vertically central portion of the manual controller 35 to hermetically seal between the manual controller 35 and the inner peripheral wall of the manual controller chamber 31. A grip portion (not shown) is formed at the proximal (upper) end of the manual controller 35. By holding the grip portion, the manual controller 35 is actuated in the vertical direction. It should be noted that a mechanism for locking the manual controller 35 at a lower position may be provided.

The lower half of the manual controller 35 forms an engagement member 39 slightly smaller in diameter than the proximal end portion of the manual controller 35. The distal (lower) end portion of the engagement member 39 is formed with a sloped surface 34 facing rightward. A downward actuation of the manual controller 35 causes the sloped surface 34 to contact the sloped portion 37 of the guide projection 33, thereby enabling the piston 40 and the main valve element 14 to be moved rightward. The left side of a lower part of the manual controller chamber 31 is formed with a support surface 38 projecting inward. The left side surface of the manual controller 35 (engagement member 39) slidably contacts the support surface 38, thereby preventing the sloped surface 34 from undesirably moving leftward (preventing the sloped surface 34 and the sloped portion 37 from undesirably disengaging from each other) when the manual controller 35 is actuated downward. It should be noted that although the sloped surface 34 is formed on the distal end portion of the manual controller 35 in FIGS. 1A and 1B, the sloped surface 34 may be formed on a portion of the manual controller 35 other than the distal end portion, e.g. on the right side of a vertically intermediate portion of the manual controller 35.

FIGS. 1A and 1B show a state where an OFF signal is output from the pilot valve 12. In this state, the sloped surface 34 of the manual controller 35 and the sloped portion 37 of the guide projection 33 are separate from each other. The output port a is communicated with the exhaust port e. The piston first chamber 22 is communicated with the atmosphere through the output passage 28 and so forth. The piston 40 and the main valve element 14 are placed at an OFF position (left position) by the resilient force of the spring 17. The supply port p and the first output port A are communicated with each other. The second output port B and the second exhaust port EB are communicated with each other. When an ON signal is output from the pilot valve 12, the valve element 18 is switched over. Consequently, compressed air flows into the piston first chamber 22 from the supply port P through the supply passage 27 and the output passage 28, causing the piston 40 and the main valve element 14 to move against the resilient force of the spring 17. Thus, the main valve element 14 is switched to an ON position.

When it is desired to forcedly switch the main valve element 14 to the ON position irrespective of the output signal from the pilot valve 12, as shown in FIG. 2, the grip portion of the manual controller 35 is depressed by hand. As the manual controller 35 moves downward, the sloped surface 34 of the manual controller 35 begins to engage the sloped portion 37 of the guide projection 33. In response to the downward movement of the sloped surface 34, the sloped portion 37 moves rightward. The rightward movement of the sloped portion 37 causes the piston 40 and the main valve element 14 to move rightward, thereby allowing the main valve element 14 to be switched to the ON position.

It should be noted that the present invention is not limited to the foregoing embodiment but can be modified in a variety of ways.

What is claimed is:

1. In a pilot-controlled electromagnetic valve comprising:
   a piston chamber;
   a main valve chamber formed at one side of the piston chamber;
   a manual controller chamber formed at the other side of the piston chamber with a partition interposed therebetween;
   a piston slidably provided in the piston chamber; and
   a main valve element slidably provided in the main valve chamber;
   wherein the main valve element is moved by movement of the piston;
   the improvement which comprises:
   a guide hole formed in said partition;
   a guide projection formed on the other side of said piston, said guide projection being inserted through said guide hole to project into said manual controller chamber; and
   a manual controller reciprocatably provided in said manual controller chamber, said manual controller having a sloped surface;
   wherein actuation of said manual controller causes said sloped surface to contact said guide projection, thereby moving said piston.

2. A pilot-controlled electromagnetic valve according to claim 1, wherein said sloped surface is formed on a distal end portion of said manual controller to face toward the one side, and a gently sloped portion is formed at a distal end of said guide projection, wherein said sloped surface and said sloped portion are engageable with each other.

3. A pilot-controlled electromagnetic valve according to claim 1, wherein a support surface is formed on the other side of said manual controller chamber, so that a surface on the other side of said manual controller slidably contacts said support surface, thereby preventing said sloped surface from moving in a direction toward the other side.

4. A pilot-controlled electromagnetic valve according to claim 1, wherein said manual controller is unable to rotate and movable within a limited range in said manual controller chamber.

* * * * *